United States Patent
Torguet

[11] 3,799,652
[45] Mar. 26, 1974

[54] OPTICAL DEFLECTION SYSTEM WITH ACOUSTO OPTICAL CELL AND ASSOCIATED PRISMS

[75] Inventor: Roger Torguet, Paris, France
[73] Assignee: Thomson-CSF, Paris, France
[22] Filed: Mar. 2, 1972
[21] Appl. No.: 231,189

[30] Foreign Application Priority Data
Mar. 5, 1971  France .............................. 71.07611
July 13, 1971  France .............................. 71.25715

[52] U.S. Cl. .................................. 350/161, 350/182
[51] Int. Cl. ................................................ G02f 1/28
[58] Field of Search ...................... 350/161, 181, 182

[56] References Cited
UNITED STATES PATENTS
2,405,960  8/1946  Land .................................. 350/286
2,017,634  10/1935  Newcomber ...................... 350/182
3,355,579  11/1967  Robertson .................. 350/161 UX
3,397,605  8/1968  Brueggemann ..................... 350/161
3,457,425  7/1969  Preston ........................... 350/161 X
3,462,212  8/1969  Denton ........................... 350/160 R Primary Examiner—Ronald L. Wibert
Assistant Examiner—Paul K. Godwin
Attorney, Agent, or Firm—Cushman, Darby & Cushman

[57] ABSTRACT

The present invention relates to acousto-optical systems capable of deflecting a substantially monochromatic radiant energy beam.

The acousto-optical system in accordance with the invention comprises an acousto-optical deflection cell surrounded by sets of prisms capable of producing anamorphosis of the transverse section of the radiant energy beam respectively ahead and beyond the deflection cell.

The invention can be applied to any angular scan optical system operating with substantially monochromatic light, this at very high scanning velocities.

23 Claims, 10 Drawing Figures

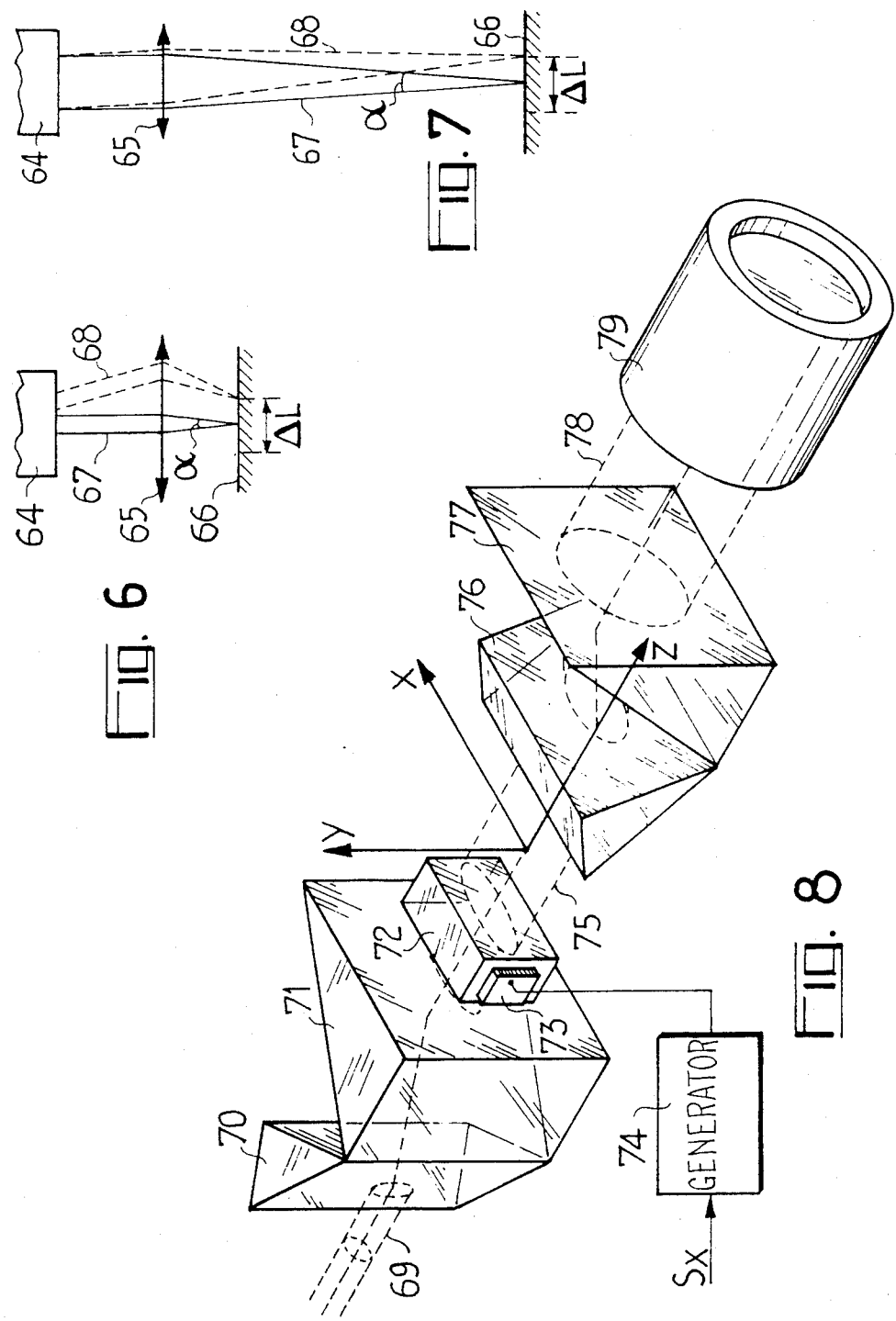

OPTICAL DEFLECTION SYSTEM WITH ACOUSTO OPTICAL CELL AND ASSOCIATED PRISMS

The present invention relates to systems for deflecting a monochromatic beam of radiant energy, under the control of an electrical signal. It relates more particularly to acoustooptical deflection systems in which the instantaneous frequency of the electrical control signal fixes the instantaneous value of the deflection angle.

Acousto-optical deflection systems of known kind essentially consist of a bar of elastic material whose refractive index is modulated by means of an ultrasonic wave coming from an electro-mechanical transducer fixed to one of the ends of the bar. When an electrical control signal is applied to the input terminals of the transducer, the variations in the refractive index within the body of the bar, produce a phenomenon of optical reflection. By using an appropriate ultrasonic energy density, it is observed that the radiant energy beam can be totally reflected if it meets the ultrasonic wave at the Bragg angle. If the frequency of the ultrasonic wave changes, less marked reflection is observed in the modified direction of the reflected beam. It can be shown that the coefficient of optical reflection of an acousto-optical cell is only in the order of unity as long as the deflection range is limited to a few degrees ; this is an inherent drawback of the fundamental principle of acousto-optical deflection.

In order to help to overcome this drawback, it is possible to arrange beyond an acousto-optical cell, a telescope whose magnification makes it possible to increase the deflection range ; however, the bulk, cost and optical aberrations involved by this optical combination, constitute additional drawbacks.

As far as the angular resolving power is concerned, it can be shown that the acousto-optical cell makes it possible to distinguish between a number of different directions which is the greater the larger the width of the deflected beam in the plane of deflection. Since the beams being deflected are generally quite thin, it is necessary to install optical systems upstream and downstream of the cell in order to spread the beam section and then reduce it. To this end, use can be made of afocal optical systems but these have the same drawbacks as the aforedescribed telescope.

The ultrasonic power required to create in the acoustooptical cell the appropriate energy density, is a function of the volume of the zone of interaction between the two wave systems. In order to keep this power within reasonable limits, the beam which is being deflected can be given an elliptical section whose major axis is located in the deflection plane. Infortunately, this procedure necessitates the use of cylindrical lenses located upstream and downstream of the acoustooptical cell ; if these lenses are fully corrected, then the size of the system is reduced at the expense of the cost and if these lenses are elementary, the bulk of the deflection system then becomes prohibitive.

The acousto-optical deflection systems can be utilised between a coherent radiation source and a projection lens in order to form what is virtually a point light spot on a substrate ; this light spot is intended to be capable of occupying a large number of distinct positions within a small range of the substrate. Considered on their own, acoustooptical deflection systems can be designed with negligible optical aberrations, and as such they are capable of deflecting a thin low-divergence beam in a large number of different directions within a relatively substantial angular range. However, if a deflection system of this kind is associated with a projection lens, then the latter must be fully corrected. In practice, if the section of the deflected beam is small, it is necessary to utilise a short focal length lens. On the other hand, in view of the substantial deflection angle of the deflection system, and of the fact that the centre of rotation is located inside, a lens with a large aperture number must be used. Under these conditions, the correction of aberrations is extremely costly and the result is that the projection lens becomes prohibitively expensive.

In order to overcome this drawback, the invention proposes that a projection lens which has a relatively long focal length and moderately large aperture number, be used ; this being the case, it is necessary to associate with the lens an acousto-optical reflection system the deflected beam of which illuminates a substantial portion of the pupil of the lens and displaces relatively little in relation to said pupil during the course of deflection ; since the lens cannot be located at the centre of pivoting of the beam, it is necessary to reduce the deflection amplitude.

According to the present invention there is provided an acousto-optical deflection system for deflecting a monochromatic beam of radiant energy under the control of an electrical signal, said deflection system comprising : first anamorphotic optical means positioned for receiving said beam, at least one acousto-optical cell positioned for receiving the modified beam emerging from said first anamorphotic means, and second anamorphotic optical means positioned for receiving the deflected and modified beam emerging from said acousto-optical cell ; said acousto-optical cell comprising a refringent medium and ultrasonic generator means controlled by said signal for radiating within said medium an ultrasonic wave capable of modulating the refractive index of said medium ; said ultrasonic wave having wavefronts parallel to a plane perpendicular to the deflection plane of said cell ; at least one of said anamorphotic means including at least one prism having a refractive index n for said radiant energy, said prism having an input and an output face at an angle 0, the cotangent of which is substantially equal to said refractive index n ; said faces being perpendicular to one of said planes and positioned for transmitting said beam in succession ; a deviation of said beam being imparted by said prism on only one of said faces.

For a better understanding of the invention, and to show how the same may be carried into effect, reference will be made to the ensuing description and the appended drawings among which :

FIGS. 1 and 2 are explanatory diagrams.

FIG. 3 schematically illustrates a first variant embodiment of a deflection system in accordance with the invention.

FIGS. 6 and 7 are explanatory figures.

FIG. 8 illustrates an isometric view of a further embodiment of a deflection system in accordance with the invention.

The present invention relates to the acousto-optical deflection of substantially monochromatic radiant energy beams. This energy can be light energy, infra-red or ultra-violet energy, depending upon the circumstances, By way of a non-limitative example, we shall assume in the following description that the beam which is being deflected is a parallel light beam produced by an Argon laser.

Figure 1:
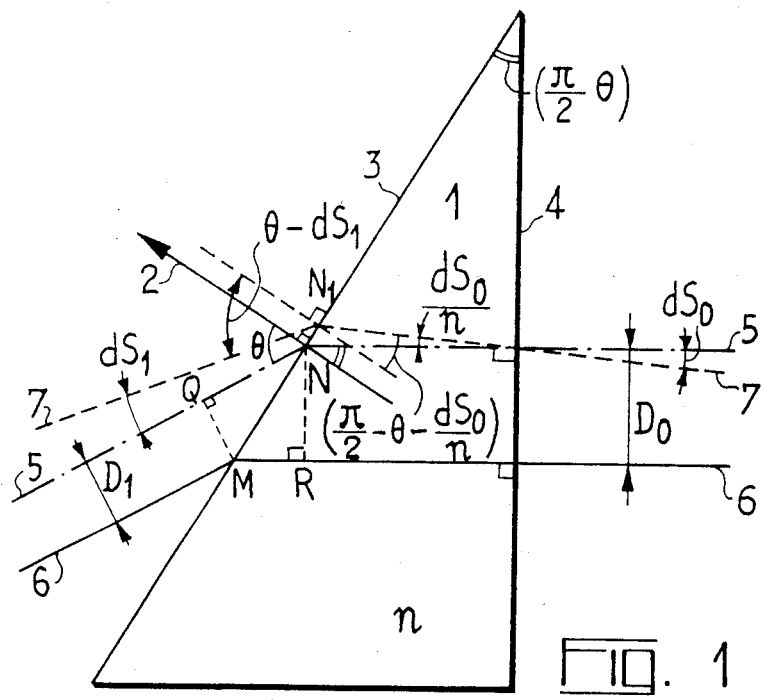

In FIG. 1, a prism 1 cut from a refractive material whose refractive index is equal to $n$ for the relevant wavelength of the lightbeam, can be seen.

The oblique faces 3 and 4 of the prism 1 subtend an angle which is equal to the complement of the Brewster angle $\theta$. This angle $\theta$ is that for which a light vibration having its electrical vector in the plane of incidence, is refracted without reflection. For a prism in air, the Brewster angle $\theta$ is given by the relationship $\tan \theta = n$.

The light ray 5 encounters the face 3 of the prism 1 at the point N with an angle of incidence $\theta$ in relation to the normal 2 ; it is refracted inside the prism and emerges perpendicularly to the face 4. This statement can be readily checked on the basis of the preceding relationship. A light ray 6 disposed parallel to the ray 5 at the interval $D_1$, encouters the prism 1 at the point M and leaves it at the distance $D_o$ from the ray 5. The rays 5 and 6 delimit a parallel light beam whose lateral size in the plane of FIG. 1 changes in the ratio $K = D_o/D_1$ when said beam passes through the prism from left to right ; if the beam section is circular at the left, then it becomes elliptical at the right since its extent measured perpendicularly to the plane of FIG. 1 experiences no change. The anamorphosis of the transverse section of the beam can be calculated readily from a consideration of the equal right-angled triangles MNR and MQN ; we then obtain the following relationship :

$K = D_o/D_1 = \tan \theta = n$

This relationship shows that the magnification $K$ is equal to the refractive index $n$ of the prism 1. This property is of course reversible and can be utilised to spread or reduce the section of a light beam in a unidirectional manner.

Another equally remarkable property of the prism operated at the Brewster angle, will be apparent from a consideration of the light ray 7 which makes an angle $dSo$ with ray 5 at entry to the face 4 of the prism 1. Since the ray 7 enters the prism at an angle close to the normal to the face 4, it is refracted inside the prism at an angle substantially equal to $dSo/n$. The refracted ray 7 reaches a face 3 at the point $N_1$ with an angle of incidence equal to $[\pi/2 - \theta - (dSo/n)]$. On emerging from the face 3, the ray 7 makes with the normal at $N_1$, an angle $(\theta - dS1)$ where $dS1$ represents its change in direction in relation to the ray 5.

By applying the laws of oblique refraction at the point $N_1$, we obtain the condition :

$\sin(\theta - dS1) = n \sin[\pi/2 - \theta - (dSo/n)]$ which can be simplified thanks to the relationship $\tan \theta = n$, to finally give us the relationship : $dS1/dSo = n$.

Te foregoing demonstration points up the fact that the prism 1, without introducing the least aberration, is capable not only of changing the width of the beam in the ratio $n$, but also of changing the deflection angle of said beam in the ratio $n$. In other words, if the beam width is multiplied by $n$, its deflection is divided by $n$ and vice versa.

In the case where the light beam is polarised in such a way that its electrical vector is contained in the plane of the FIG, the transmission of the power is excellent across the face 3 ; it is only transmission across face 4 which results in a slight loss and this can be eliminated by giving said face an appropriate optical coating.

Figure 2:
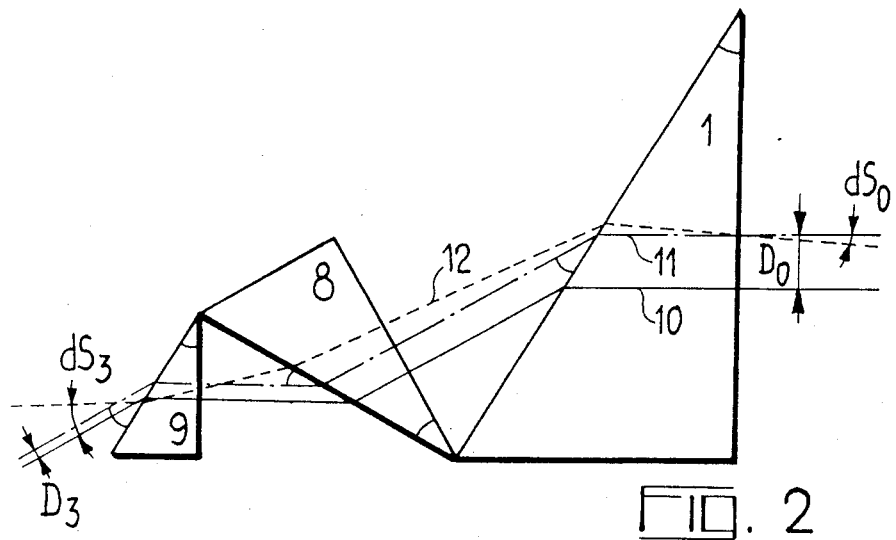

In FIG. 2, a train of prisms 1, 8 and 9 cut and orientated in the same fashion as the prism of FIG. 1, can be seen. It will be observed that the mutually opposite faces of two successive prisms make the Brewster angle $\theta$ with one another and that the same applies to the two other faces. If $p$ is the number of prisms making up the train in FIG. 2, then we have the relationship :

$Do/D3 = dS3/dSo = n^p$

This very simple relationship can be proven by following the light rays 11, 10 and 12 which respectively correspond to the rays 5, 6 and 7 of FIG. 1 ; $D3$ represents the width of the beam at exit from the prism 9 and $S_z$ its deflection angle when it is deflected by $dSo$ at entry to the prism 1.

Experience shows that an optical system of the kind illustrated in FIG. 2 has a small size, a light efficiency close to unity and no aberrations whatsoever ; this remains the case for a deflection range which is in the order of 15° if three prisms cut from a material having a refractive index close to 1.8, are used. In addition, the deflected fractions which emerge from the prism 9 have a centre of pivot which is close to the exit face of said prism.

Figure 3:
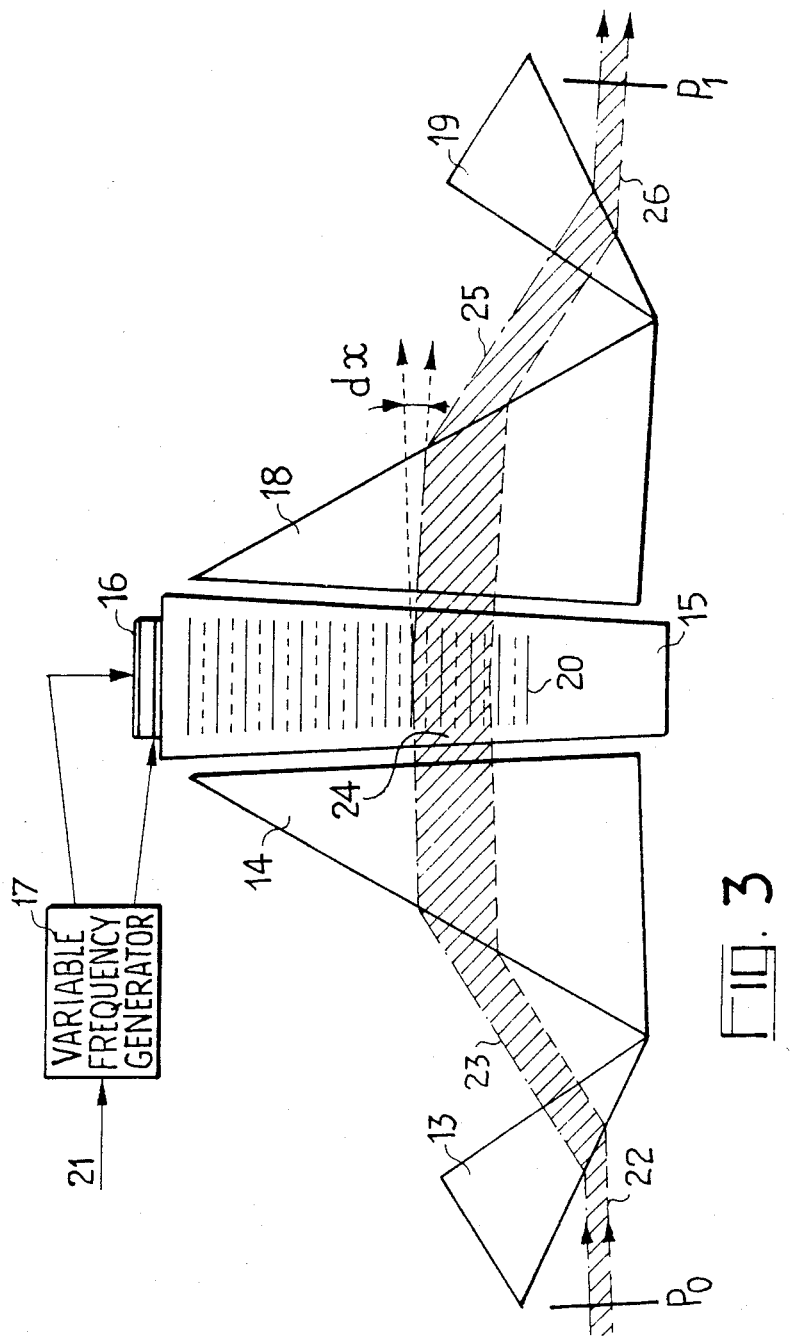

In FIG. 3, an acousto-optical deflection system in accordance with the invention can be seen. This system comprises an acousto-optical deflection cell made up of an elastic bar 15 of refractive material. To one end of this bar there is attached an electro-mechanical transducer 16 excited by an alternating voltage coming from a variable frequency generator 17. The transducer 17 produces in the bar an ultrasonic energy beam 20 which modulates its refractive index ; the bar behaves then as a stratified medium which is able to deflect from its incident trajectory a light beam whose portion 24 interacts with the ultrasonic wave 20 to produce the deflection $dx$. It is well-known that if the ultrasonic frequency is varied slightly under the influence of a control signal applied to the input 21 of the generator 17, a corresponding variation in the deflection angle $dx$ takes place. It is likewise well-known that the intensity of the deflected light beam is only substantially equal to the intensity of the incident light beam if the ultrasonic energy density has an appropriate value in the interaction zone ; thus, the range of variation of the angle $dx$ should not exceed more than a few degrees.

The two conditions mean that the acousto-optical cell considered on its own, is essentially a deflection system of low deflection amplitude.

If it is desired to obtain a large number of different directions within the deflection range, whilst achieving a substantially uniform efficiency, then it will be seen that the cell must pass a lightbeam of substantial width. If the beam section is circular, the interaction zone is substantial and requires a high ultrasonic power, and this, at a frequency of several tens of megacycles, requires the use of a relatively expensive electrical generator.

In order to overcome these drawbacks, the acousto-optical cell illustrated in FIG. 3 is surrounded by a first train of prisms 13, 14 located upstream of it and a second train of prisms 18, 19 located downstream of it. A lightbeam propagates through the optical system of FIG. 3, in the manner illustrated by the cross-hatched area defined between two light rays respectively represented by a dotted line and a chain-dotted line. The portion 22 of the lightbeam corresponds for example to a plane wave Po arriving at an angle of incidence corresponding to the Brewster angle $\theta$, at the entry face of the prism 13 ; the portion 23 of the beam emerges from the prisms 23 with a width which has increased in the ratio $n$ ; the prism 14 has the same effect and supplies to the cell 15 a beam the portion 24 of which is substantially wider and is reflected at the angle $dx$ by the ultrasonic wave 20. At the exit from the cell 15 the prisms 18 and 19 transmit beam portions 25 and 26 which have decreasing widths ; the light emerging from the system of the FIG. 3, remains as a plane wave P1 and, provided that the same sets of prisms are used at each side of the cell 15, the outgoing beam 26 will have exactly the same configuration as the entry beam 22.

When the frequency of the ultrasonic wave is modified, the deflection $dx$ changes by a quantity which remains within a narrow range. However, the portion 26 of the beam experiences a change in orientation equal to said quantity, multiplied by $n^p$. The substantial increase in the deflection which results from the action of the set of prisms 18, 19, is achieved automatically and at the same time the deflected beam is restored to its initial configuration. The set of prisms 13, 14 preceeds the deflecting cell and therefore does not produce any gain in the angle of deflection of the beam. However, it has the substantial advantage of producing in a more efficient manner than any other optical system, the widening in the plane of deflection of the beam which is being deflected.

The use of the prisms 18 and 19 enlarges the field of application of acousto-optical deflection cells ; the addition of the prisms is furthermore an excellent method of reducing the size and the ultrasonic power consumption.

Figure 4:
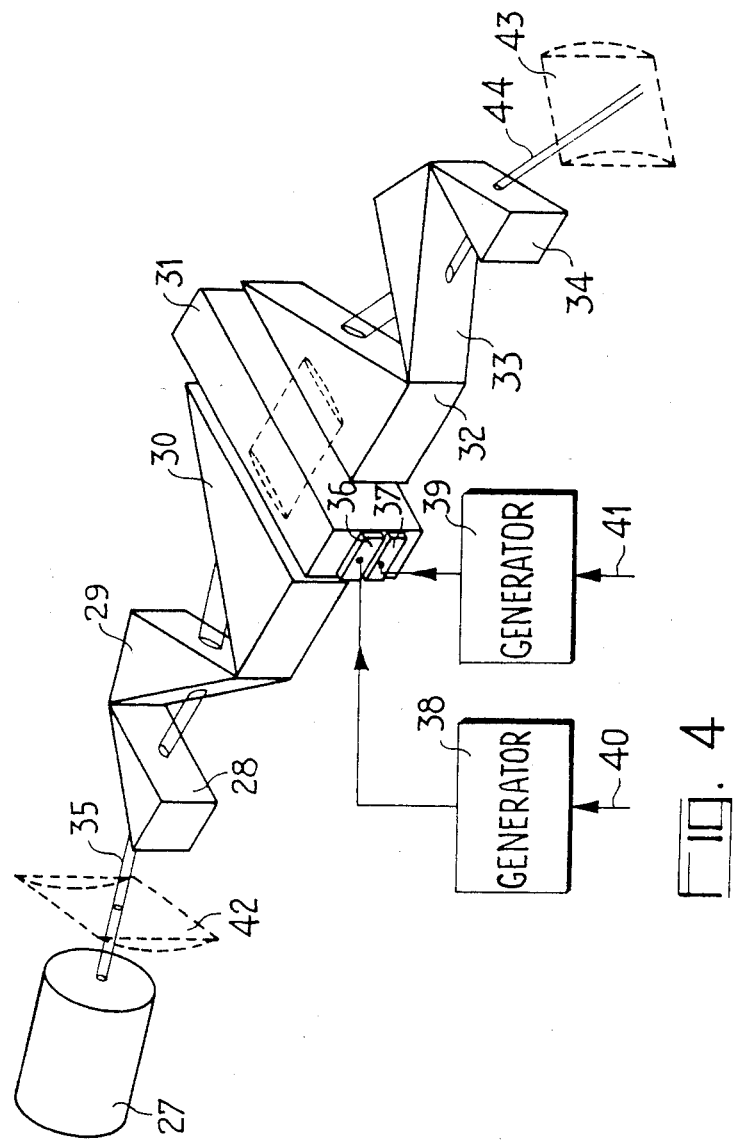
FIG. 4 is a perspective view of a unidirectional deflection system which may possibly comprise several channels.

In FIG. 4, a perspective view of a first variant embodiment of the acousto-optical deflector system in accordance with the invention can be seen. The acousto-optical cell 31 incorporates an elastic bar transmitting the power coming from the radiation source 27 ; to one end of the bar there are attached electro-mechanical transducers 36 and 37 which can emit highly directional ultrasonic beams ; these transducers are excited by generators 38 and 39 which supply alternating voltages whose frequencies vary in accordance with the scanning signals applied to the inputs 40 and 41. Said prisms 28, 29, 30 and 32, 33 and 34, are arranged at either side of the acousto-optical cell 31.

In FIG. 4, the path of an energy beam 35 radiated by the source 27, has been illustrated, this beam 35 is a thin parallel circular-section beam which is transformed on passage through the prisms 28, 29 and 30 to beam portions of increasingly large elliptical section. At the cell 31, the radiated energy is contained in a very flat volume, illustrated in dotted fashion. This volume is located in a trajectory of the ultrasonic energy emitted for example by the transducer 36; it gives rise to a deflected beam which successively passes through the prisms 32, 33 and 34. At the exit from the prism 34, the deflected beam 44 has been restored to its original circular section. The ultrasonic energy supplied to the transducer 36 is very much lower than that which would have to be supplied if the beam being deflected had a diameter comparable to the major axis of the real elliptical section. Experience has shown that by utilising a train of three prisms, it is possible to reduce to a tenth of its value the ultrasonic power required to compeletely deflect the radiated energy.

Without deaparting from the scope of the invention, the system of FIG. 4 makes it possible to deflect several separate beams in parallel planes ; to do so it is merely necessary to equip the bar 31 with several transducers 36, 37 etc. It goes without saying that, likewise, several superimposed bars can be provided in order to create a multichannel deflector. Also, it is possible to arrange between the sets of prisms, several rows of bars in order to produce an overall deflection through the agency of several elementary deflections whose amplitudes are additive.

The deflection system illustrated in full line in FIG. 4 has no aberration and is therefore suitable for the undistorted transmission of any kind of optical modulation applied to the beam being deflected. The gain which can be achieved in the ultrasonic excitation power, can be still further increased by ranging upstream and downstream of the system 28 to 34, cylindrical lenses 42 and 43 which create an afocal system whose convergence point is located in the zone of interaction of the bar 31 ; this technique makes it possible to shorten the minor axis of the elliptical section of the beam within the deflection cell ; this produces no appreciable distortion since the lenses 42 and 43 are located at points where the beam is very thin in relation to the focal length.

Instead of using the cylindrical lenses 42 and 43, the beam can also be reduced in section in the direction perpendicular to the plane of deflection, with the help of prisms similar to that shown in FIG. 1.

The transmission of the radiated power through the deflection system in accordance with the invention, is effected with very high efficiency; in fact one out of the two faces of each prism receives or transmits the energy at the Brewster angle whilst the other faces only produce very small optical losses. However, these small losses can be also eliminated by optical coating of the relevant faces. As far as the prisms 30 and 32 are concerned they can be made integral with the lateral faces of the cell 31 by using a well-known bonding technique. Equally, the assembly 30, 31, 32 can be cut in one piece from a material having a high refractive index $n$ and good acouto-optical deflection properties.

Figure 5:
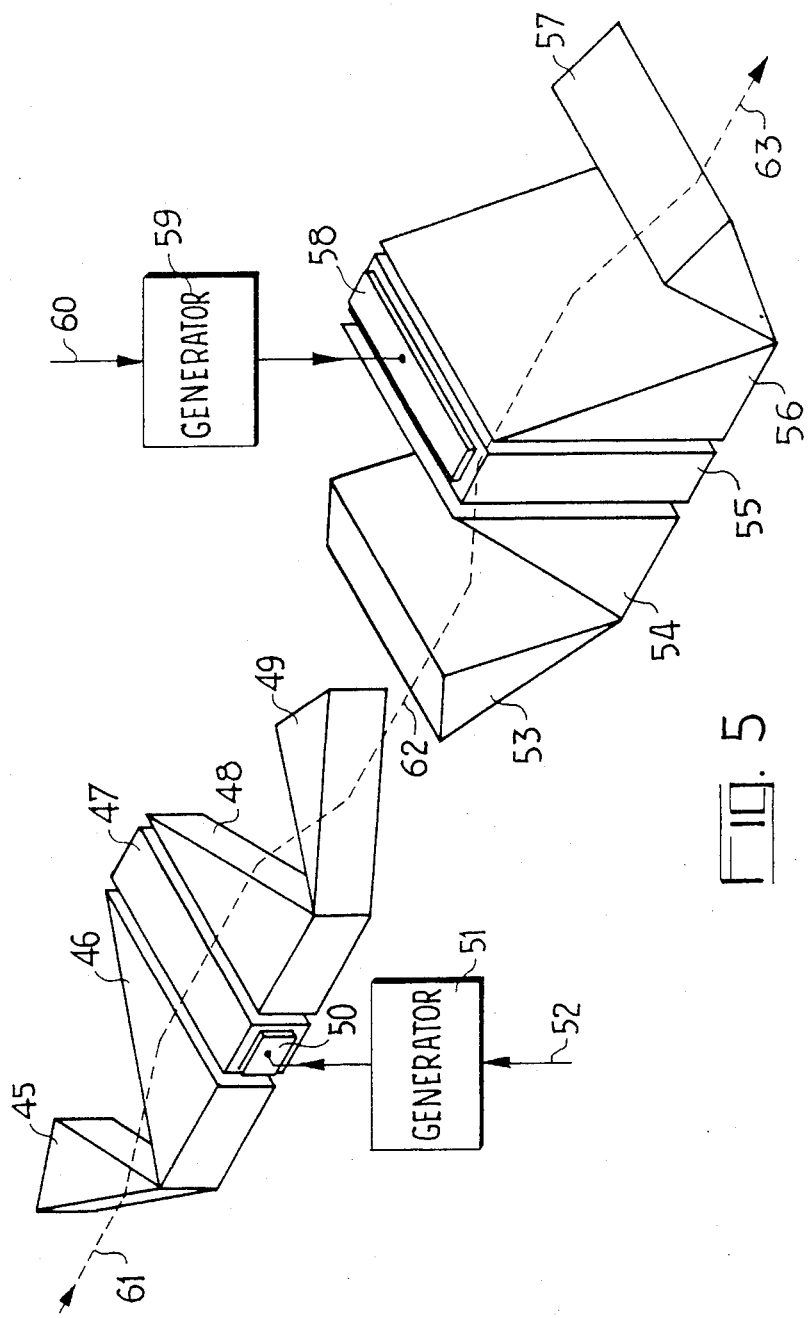
FIG. 5 is a perspective view of a bidirectional two-stage deflection system.

In FIG. 5, a perspective veiw of a two-directional acoustooptical deflector in accordance with the invention, can be seen. It comprises a first deflection system with an acoustooptical cell 47, 50 connected to a generator 51 and two sets of prisms 45, 46 and 48, 49. At the exit from the first deflection system, there is arranged at rightangles a second deflection system which comprises an acousto-optical cell 55, 58 connected to a generator 59 and two sets of prisms, 53, 54 and 56, 57. A light ray passes through the deflection system of FIG. 5 in the manner indicated by the dotted line ; the portion 62 of this trajectory experiences a deflection, in relation to the portion 61, in a plane parallel to the triangular faces of the prisms 45, 46, 48 and 49 ; the portion 63 of the same trajectory experiences a deflection in a plane parallel to the triangular faces of the prisms 54, 54, 56 and 57. The two-directional deflection is obtained by applying to the inputs 52 and 60 of the generators 51 and 59, scanning voltages which are designed to change the frequency of the ultrasonic waves excited by the electromechanical transducers 50 and 58. It can be seen from a consideration of FIG. 5 that the deflection system at the right is narrower than that at the left ; this difference is the greater the larger the the longitudinal size of the deflection systems. Since the deflection systems in accordance with the invention are relatively short, the transverse size of the second deflection system is likewise small.

It is worthy of mention that the deflection devices illustrated in FIGS. 3, 4 and 5 can be utilised behind a light source as a means of ultra high speed scanning but may also be associated with a photoelectric transducer for the high speed analysis of the light emission from an object illuminated by quasi-monochromatic light. Associated with a convergent lense, these acusto-optical deflectors can operate as lightbeam translators.

In FIG. 6, a system for projecting a light spot onto a screen 66, can be seen. The system comprises a light deflector 64 and a projection lens 65. The light beam 67 illuminates the centre of a range ΔL of the screen 66, but under the action of the deflector 64 it can adopt the extreme position 68 which corresponds to the illumination of the right-hand edge of the range ΔL.

It has been assumed, in FIG. 6, that the beam 67 is a parallel thin-section beam which can be given a substantial angular deflection, but in order to produce a very sharp spot, the convergence angle α has been made relatively large. The result is that the lens 65 must have a short focal length and be close to the screen 66. Although the focal length is short, the range ΔL is still relatively large thanks to the substantial amplitude of deflection produced by the deflection system 64.

The system of FIG. 6 employs a lens 65 of large aperture number, since its pupil must be sufficiently wide to accept the beam 67 whatever the deflection imposed on the latter by the deflection system 64. It will be seen, too, that the aberrations must be fully corrected within a substantial field so that it is difficult to satisfy all these requirement with lenses of current design.

In accordance with the invention, it is possible to avoid the need for an extremely expensive lens by changing the characteristics of operation of the acusto-optical deflector.

FIG. 7 illustrates a deflection system incorporating with a lens 65 of focal length K times longer than that of the corresponding lens in FIG. 6. In order to facilitate comparison, we have adhered to the same range ΔL and the same spot diameter ; thus, a deflected beam of transverse section K times wider and angular deflection amplitude K times smaller has been adopted. It will be observed from a consideration of FIG. 7 that the diameter of the lens 65 is hardly any greater than the diameter of the beam 67 and that its aperture number is much less than that which was required in the case of FIG. 6. Moreover, it will be observed from FIG. 7 that the angle of field of the lens 65 is K times less than that of the lens in FIG. 6. It will be evident from this that the correction of aberratons in the projection lens is very much facilitated provided that it is associated with a deflection system producing a wide section beam which is deflected by a relatively small extent.

A deflection system in accordance with the diagram of FIG. 7 is illustrated in FIG. 8. It is made up of a first set of prisms 70, 71, a second set of prisms 76, 77 and an acusto-optical cell constituted by an elastic bar 72 in which an ultrasonic beam is excited by means of an electromechanical transducer 73.

The transducer 73 is excited by an electrical generator 74 whose frequency of oscillation is controlled by a scanning signal $S_x$. The deflection system of FIG. 8 receives a light beam 69 of reduced circular section and produces a deflected beam 78 of enlarged circular section which enters the projection lens at 79.

Those skilled in the art will be aware that the beam 69 experiences anamorphosis of its transverse section on passing through the set of prisms, 70, 71 ; at the exit from the cells 72, 73, a beam 75 is produced the elliptical section of which has a substantial enlargement in the X direction. This is of such a nature as to promote the acustooptical interaction with the ultrasonic wave which progresses in the X direction through the cell 72. Moreover, the plane of deflection of the beam 75 is the plane XZ which is perpendicular to the oblique entry and exit faces of the prisms 70 and 71. If, downstream of the cell 72, a set of prisms constituting the image of the set 70, 71 in relation to the plane YX, were placed, then at the entry to the lens 79 a highly deflected beam would be obtained whose transverse section would be exactly the same as that of the incident beam 69.

In accordance with the invention, and considering FIG. 8, it will be seen that the set of prisms 76, 77 located downstream of the cell 72 has its oblique faces arranged in such fashion that the common edges are parallel to the deflection plane XZ ; in addition, the sets of prisms 76, 77 and 70, 71 are identical and pass the light in the same direction. Thus, two successive processes of anamorphosis occur which have the effect of expanding the beam section first of all in the X direction and then in the Y direction. The section of the beam 78 is thus a circular section of substantially larger diameter than that of the incident beam 69. Given the fact that the oblique entry and exit faces of the prisms 76 and 77 are perpendicular to the YZ plane, there is not amplification of the deflection after leaving these prisms. The absence of this amplification is in no way a drawback, as has been explained in the context of FIG. 7.

The device of FIG. 8 is an acousto-optical deflection system operating in one direction only and suitable for the deflection of a thin beam 69.

Without departing from the scope of the invention, it can be operated in the reverse direction. In this case, the wide beam 78 is the instant beam which it is desired to deflect and the thin beam 69 becomes the deflected beam. This mode of operation of the deflection system of FIG. 8 is advantageous where the light source is an incoherent light source, because as those skilled in the art will well appreciate it is not possible with sources of this kind to obtain substantially parallel thin beams in the way that is possible with lasers.

In very many applications, it is not sufficient to associate with a deflection lens a single acousto-optical deflection system. Whenever it is desired to scan a surface in two mutually perpendicular directions X and Y, then two deflection systems are arranged in a cascade fashion.

Figure 9:
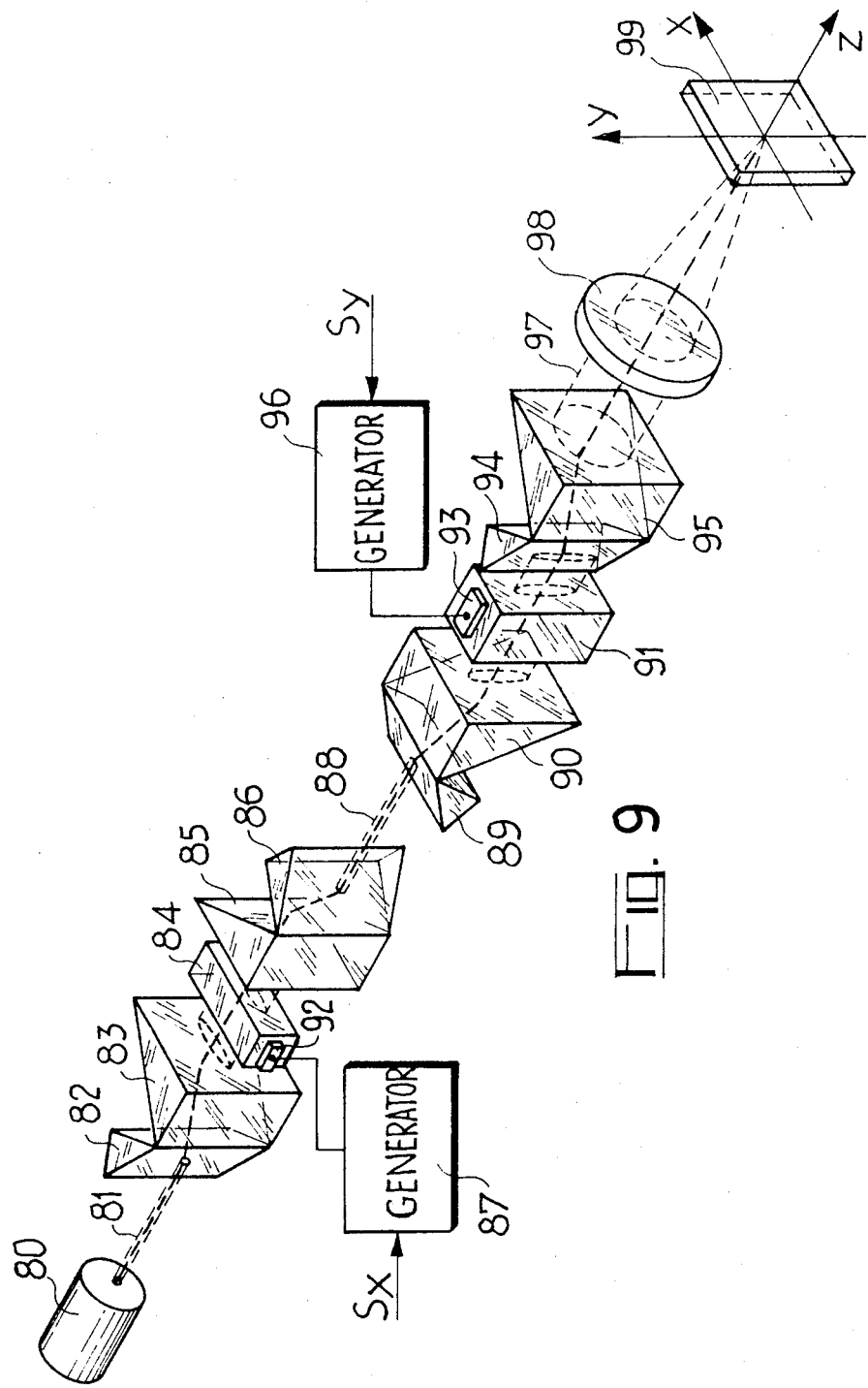
FIG. 9 illustrates an isometric view of a still further embodiment of a deflection system in accordance with the invention.

In FIG. 9, an acousto-optical system XY for scanning a screen 99 by a light beam 81 emitted by a coherent source 80, can be seen. A first acousto-optical deflection system 82, 83, 84, 85, 86, 87, 92, under the control of a signal $S_X$, produces deflection in the X direction of the thin beam 81 ; the thin beam coming from this first deflector is received by a second acousto-optical deflector 89, 90, 91, 92, 93, 94, 95, 96, which under the control of a signal $S_Y$, produces deflection of the thin beam 88 in the Y direction. The deflected beam 97 has an enlarged transverse section in order to cover a substantial portion of the pupil of the projection lens 98.

Bearing in mind the respective orientations of the sets of prisms 82, 83, 85 and 86, the beam 88 has exactly the same section as the beam 81 ; moreover, on crossing the prisms 85 and 86 the beam 88 experiences a deflection gain which is not cancelled on crossing the prisms 89 and 90 ; however, this gain is cancelled out when the beam crosses the prisms 94 and 95.

As far as the second acousto-optical deflection system is concerned, the operation is the same as that of the deflection system shown in FIG. 8. Thus, no deflection gain is obtained in the second deflection system but it does introduce a substantial elargement in the section of the beam 97. Overall, the system of FIG. 9 has the same advantages as that of FIG. 8. In view of the fact that the demands are less stringent as far as aberration in the projection lens 98 is concerned, it is possible to make said projection lens in the form of a holographic lens, utilising coherent light ; the absence of any aberration in the deflection systems avoids any distortion in the wave fronts which illuminate the holographic lens.

Figure 10:
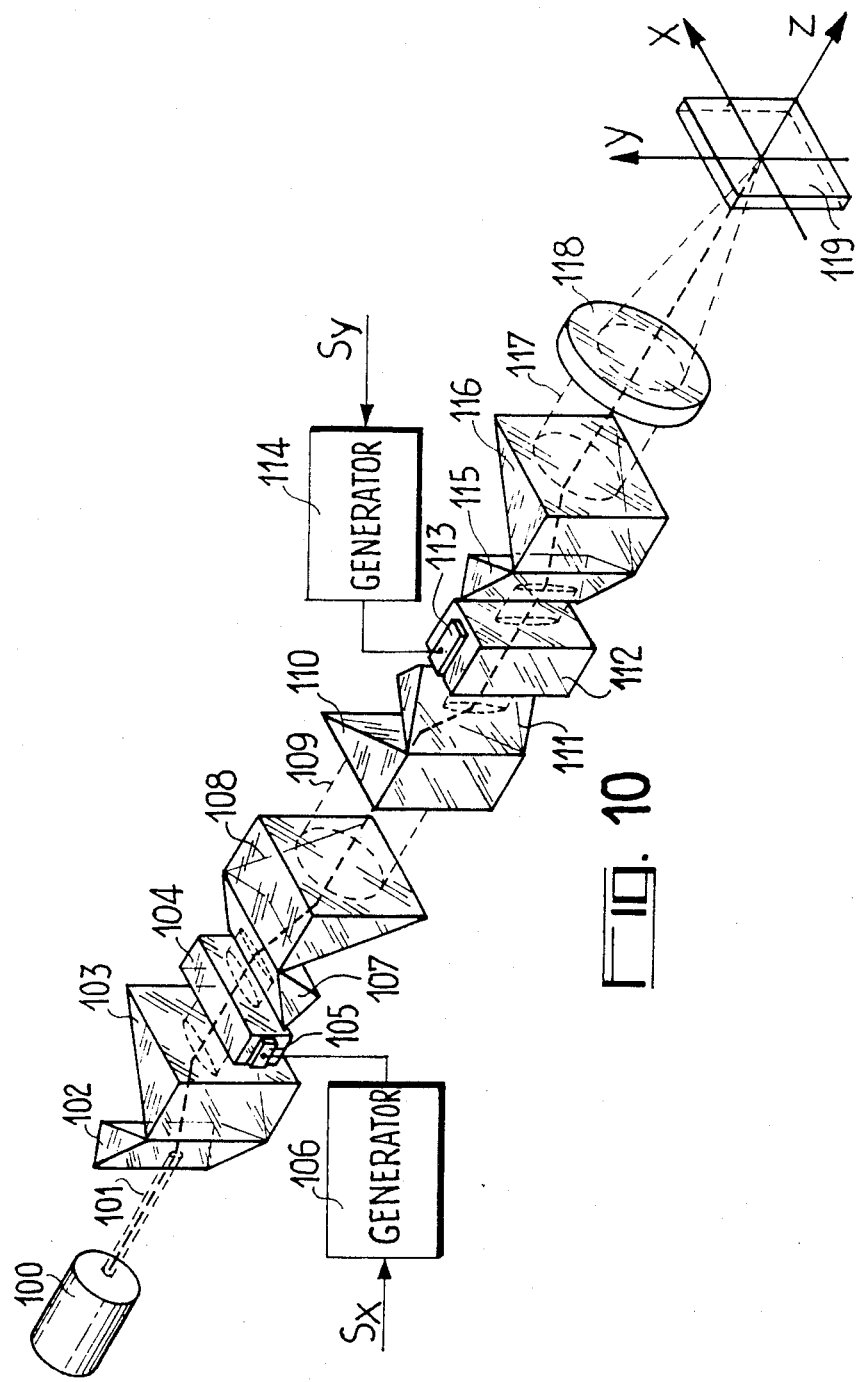
FIG. 10 illustrates an isometric view of a still further embodiment of a deflection system in accordance with the invention.

In FIG. 10, another embodiment of a system XY for carrying out acousto-optical scanning of the screen 119 by means of a coherent source 100, can be seen.

The deflection system of FIG. 10 comprises a first acoustooptical deflection device 102, 103, 104, 105, 106, 107, 108, which operates exactly like the deflection system of FIG. 8. The incident thin beam 101 is converted into a wide beam 109 which is deflected in the X direction as a function of the control signal $S_X$. A second acousto-optical deflection device 110, 111, 112, 113, 114, 115, 116 is arranged between the first and the projection lens 118 in order to effect deflection in the Y direction under the control of the signal $S_Y$. The sets of prisms 110, 111 and 115, 116 are arranged in such a manner that the beam 109 experiences a reduction in section at the entry to the cell 112 and a restoration of its section to the original value, when it reaches the lens 118. The transmission through the sets of prisms (107, 108), (110, 111) and (115, 116) produces no deflection gains so that the beam 117 experiences relatively little deflection ; this is not a drawback since the focal length of the lens 118 is substantial.

As far as FIG. 10 is concerned, the same comment can be made as in the case of FIG. 9. The lens 118 can, if required, be a holographic lens and the system can be used to deflect a wide beam 117 in order to obtain a thin beam 101.

It should be pointed out that FIGS. 9 and 10 illustrate all the possible configurations of acousto-optical systems with sets of prisms; since they are indistinguishable from one another except in terms of the orientation of the prisms and their order of succession, it is possible to manufacture a universal component which is adaptable to any of the applications by the combination of three units respectively containing a first set of prisms. a deflection cell and a second set of prisms.

What is claimed is:

1. acusto-optical deflection system for deflecting a monochromatic beam of radiant energy under the control of an electrical signal, said deflection system comprising : first anamorphotic optical means positioned for receiving said beam, at least one acousto-optical cell positioned for receiving the modified beam emerging from said first anamorphotic means, and second anamorphotic optical means positioned for receiving the deflected and modified beam emerging from said acousto-optical cell ; said acousto-optical cell comprising a refringent medium and ultrasonic generator means controlled by said signal for radiating within said medium an ultrasonic wave capable of modulating the refractive index of said medium ; said ultrasonic wave having wavefronts perpendicular to the deflection plane of said cell ; at least one of said anamorphotic means including at least one prism having a refractive index $n$ for said radiant energy, said prism having an input and an output face at an angle $\pi/2 - \theta$ ; the tangent of the complement $\theta$ of said angle being substantially equal to said refractive index $n$ ; said faces being positioned for transmitting said beam in succession : a deviation of said beam being imparted by said prism on only one of said faces and said deflection plane forming with the common edge of said faces an angle having one of the two values 0 and $\pi/2$.

2. Acousto-optical deflection system as claimed in claim 1, wherein said common edge perpendicular to the deflection plane of said cell.

3. Acousto-optical deflection system as claimed in claim 1, wherein said common edge is parallel to the deflection plane of said cell.

4. Acousto-optical deflection system as claimed in claim 1, wherein at least one of said anamorphotic optical means comprises a set of prisms.

5. Acousto-optical deflection system as claimed in claim 4, wherein each of said prisms has input and output faces forming with one another an angle equal to the complement of said angle $\theta$ ; the mutual opposite faces of two successive prisms in said set forming an angle equal to said angle $\theta$ and the other faces of said successive prims forming with one another an angle equal to said angle $\theta$ ; the common edges of the two faces in each of said prisms being parallel with one another.

6. Acousto-optical deflection system as claimed in claim 1, wherein each of said anamorphotic optical means comprises at least one prism having two faces perpendicular to said deflection plane and making with one another an angle equal to the complement of said angle $\theta$ ; said cell comprising a bar having two lateral faces respectively opposite one of the prism faces belonging to said first and second anamorphotic optical means; each prism having one face immediately opposite one of said lateral faces.

7. Acousto-optical deflection system as claimed in claim 6, wherein said lateral faces are substantially parallel to the immediately opposite faces of said prisms.

8. Acousto-optical deflection system as claimed in claim 6, wherein said lateral faces are in contact with the immediately opposite faces of said prisms.

9. Acousto-optical deflection system as claimed in claim 6, wherein said anamorphotic means are constituted at least partially by two triangular section portions of a prismatic block of trapezoidal section having a central part adjacent said portions ; said bar being constituted by said central part; electro-mechanical transducer means being provided to radiate through said central part a beam of ultrasonic energy.

10. Acousto-optical deflection system as claimed in claim 1, wherein one of the faces of said prisms comprises an anti-reflective coating.

11. Acousto-optical deflection system as claimed in claim 1, comprising two aligned deflection units; each of said units including an acousto-optical cell and first and second anamorphotic means respectively positioned ahead and beyond the cell included in each of said units; the respective deflection planes of said units making with one another an angle having a predetermined value.

12. Acustooptical deflection system as claimed in claim 1, further comprising first and second supplementary anamorphotic means forming an afocal optical system; said anamorphotic means and said cell being positioned between said supplementary anamorphotic means.

13. Acousto-optical deflection sytem as claimed in claim 12, wherein said first and second supplementary anamorphotic means are convergent cylindrical lenses having a common focal line; said cell being located along said focal line.

14. Acousto-optical deflection system as claimed in claim 1, wherein said ultrasonic generator means comprise at least one electro-mechanical transducer; said refringent medium being a bar carrying on one of its ends said transducer.

15. Acousto-optical deflection system as claimed in claim 1, wherein said first anamorphotic optical means is constituted by at least one prism having input and output faces perpendicular to the plane of deflection of said cell; said second anamorphotic optical means being constituted by at least one prism having input and output faces; the common edge of the input and output prism faces of said second anamorphotic optical means being parallel to said deflection plane.

16. Acousto-optical deflection system as claimed in claim 15, wherein each of said first and second anamorphotic optical means comprises a set of prisms having a plane of symmetry perpendicular to said input and output faces of said prisms; the plane of symmetry of one of said sets being arranged parallel to the deflection plane of said cell; the plane of symmetry of said other of said sets being arranged at right-angles to the plane of deflection of said cell; the order ot succession of said prisms being the same on successive passage through said first and second anamorphotic optical means.

17. Acousto-optical deflection system as claimed in claim 1, further comprising a projection lens receiving the deflected beam emerging from said second anamorphotic optical means.

18. Acousto-optical deflection system as claimed in claim 17, wherein said lens is a holographic lens.

19. Acousto-optical deflection system as claimed in claim 15, comprising first and second deflection units associated with one another and each constituted by an acousto-optical cell surrounded by sets of similar prisms; the respective deflection planes of the cells of said units making with one another an angle of predetermined value.

20. Acousto-optical deflection system as claimed in claim 19, wherein the plane of symmetry of one of said sets of prisms is disposed perpendicularly to the planes of symmetry of the three other sets of prisms; the order of succession of the prisms in one of said sets being the reverse of that in each of the three other sets.

21. Acousto-optical deflection system as claimed in claim 19, wherein the sets of prisms in one of said deflection units have a common plane of symmetry.

22. Acousto-optical deflection system as claimed in claim 21, wherein said common plane of symmetry is parallel to the deflection plane of the deflection cell of said deflection unit.

23. Acousto-optical deflection system as claimed in claim 21, wherein said common plane of symmetry is perpendicular to the deflection plane of the deflection cell of said deflection unit.

* * * * *